United States Patent
Robertson et al.

(10) Patent No.: US 10,704,975 B2
(45) Date of Patent: Jul. 7, 2020

(54) VISUAL TORQUE INDICATION FOR THREADED JOINTS

(71) Applicant: General Electric Company, Schenectady, NY (US)

(72) Inventors: Ted Lewis Robertson, Mason, OH (US); Ronald Bruce Schofield, Clarksville, OH (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 15/916,431

(22) Filed: Mar. 9, 2018

(65) Prior Publication Data

US 2019/0277715 A1    Sep. 12, 2019

(51) Int. Cl.
*F16B 31/02*    (2006.01)
*G01L 5/24*    (2006.01)
*G01L 1/24*    (2006.01)
*F16L 19/025*    (2006.01)

(52) U.S. Cl.
CPC .............. *G01L 5/24* (2013.01); *F16B 31/02* (2013.01); *F16L 19/025* (2013.01); *G01L 1/241* (2013.01); *F16L 2201/10* (2013.01)

(58) Field of Classification Search
CPC ...... F16B 1/0071; F16B 31/02; F16B 31/028; G01L 1/241; G01L 5/24
USPC ........................................................ 411/8, 13
See application file for complete search history.

(56) References Cited

U.S. PATENT DOCUMENTS

| | | | |
|---|---|---|---|
| 2,824,481 A | 2/1958 | Johnson | |
| 3,224,316 A * | 12/1965 | Grikscheit | F16B 31/02 411/13 |
| 3,383,974 A * | 5/1968 | Dahl | F16B 31/02 411/14 |
| 3,561,317 A * | 2/1971 | Rowell | F16B 31/021 411/5 |
| 3,574,359 A * | 4/1971 | Klein | F16L 37/144 285/86 |
| 3,964,299 A | 6/1976 | Johnson | |
| 4,002,139 A | 1/1977 | Payne | |
| 5,794,657 A * | 8/1998 | Oberg | B60K 15/03 137/538 |
| 6,609,865 B2 | 8/2003 | Daigneault | |
| 7,021,153 B2 | 4/2006 | Almanstoetter et al. | |
| 8,382,409 B2 * | 2/2013 | Wallace | G01L 5/243 411/13 |
| 8,511,155 B2 * | 8/2013 | Patient | G01L 7/086 73/146 |
| 8,540,468 B2 | 9/2013 | Mekid et al. | |
| 8,683,869 B2 | 4/2014 | Herley et al. | |
| 2002/0023504 A1 | 2/2002 | Austin | |
| 2003/0116972 A1 * | 6/2003 | Daigneault | F16B 31/028 292/18 |
| 2006/0225511 A1 * | 10/2006 | Burmann | G01L 5/246 73/761 |
| 2008/0193249 A1 * | 8/2008 | Hill | F16B 31/02 411/9 |

(Continued)

*Primary Examiner* — Roberta S Delisle
(74) *Attorney, Agent, or Firm* — General Electric Company; Pamela Kachur

(57) ABSTRACT

A threaded element for a mechanical joint includes a body including threads and a visual torque indicator disposed on the body, the torque indicator including a strain-responsive material configured to change visual appearance in response to the application of a strain of a predetermined first magnitude thereto.

19 Claims, 4 Drawing Sheets

(56) References Cited

U.S. PATENT DOCUMENTS

2011/0123288 A1* 5/2011 Wallace ............... F16B 31/028
　　　　　　　　　　　　　　　　　　　　　411/13
2016/0123369 A1　5/2016 Bernhardt

* cited by examiner

US 10,704,975 B2

VISUAL TORQUE INDICATION FOR THREADED JOINTS

BACKGROUND OF THE INVENTION

This invention relates generally to threaded joints, and more particularly to threaded joints having a visual indication of proper torqueing.

Many types of machinery include threaded joints which must remain secure for safe and proper operation. One example of a common threaded joint are fluid conduit joints using flared coupling nuts (e.g. SAE AS5175), commonly referred to as "B-nuts" in the aircraft industry. Common examples for this type of joint would be fluid lines carrying air, oil, or fuel in a gas turbine engine.

Improperly tightened B nuts are a significant contributor to field leak events and has the potential to create significant consequences such as engine fires and/or in-flight shutdowns. While threaded fasteners torqued under controlled conditions, such as a factory with highly skilled workers, pose very few problems, field repairs may be often carried out by less experienced personnel and/or under sub-optimal conditions.

For example, threaded joints that are typically field accessible (accessories, pipes, etc. that are underneath the external cowling of a gas turbine engine) are routinely repaired in the field. In general, it is not possible to discern if the threaded joint has been properly torqued or if the joint has been torqued at all.

BRIEF DESCRIPTION OF THE INVENTION

At least one of the above-noted problems is addressed by a threaded joint incorporating a visual torque indicator that permits determination of proper torqueing using visual inspection methods.

According to one aspect of the technology described herein, a threaded element for a mechanical joint includes a body including threads and a visual torque indicator disposed on the body, the torque indicator including a strain-responsive material configured to change visual appearance in response to the application of a strain thereto.

According to another aspect of the technology described herein, a threaded joint assembly includes: a first element having first threads; a second element having second threads complementary to the first threads; and wherein at least one of the first and second elements includes: a body; and at least one visual indicator disposed on the body, the torque indicator including a strain-responsive material configured to change visual appearance in response to the application of a strain thereto.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
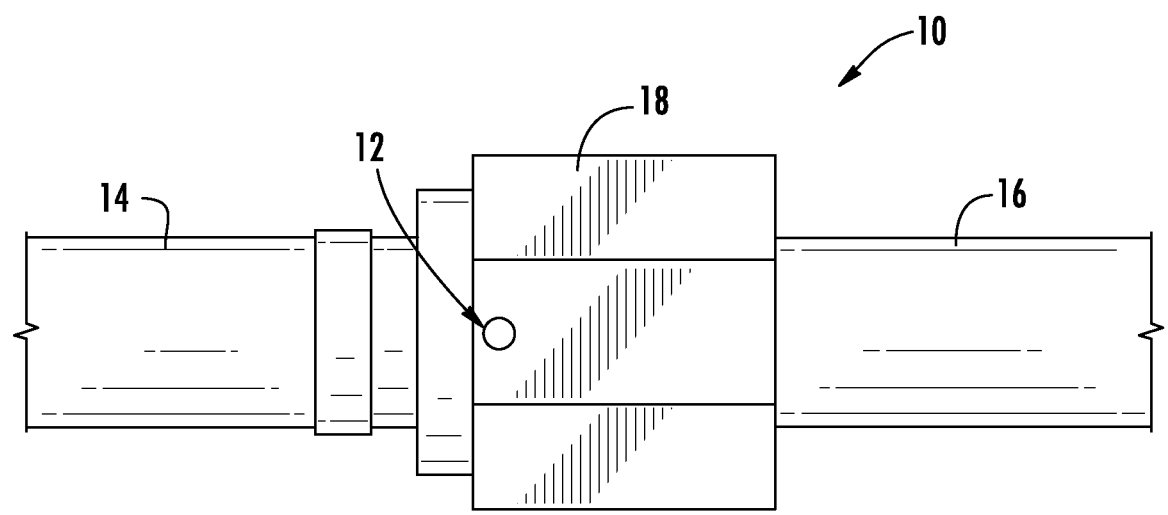
FIG. 1 shows a threaded joint assembly incorporating a visual torque indicator.
Figure 2:
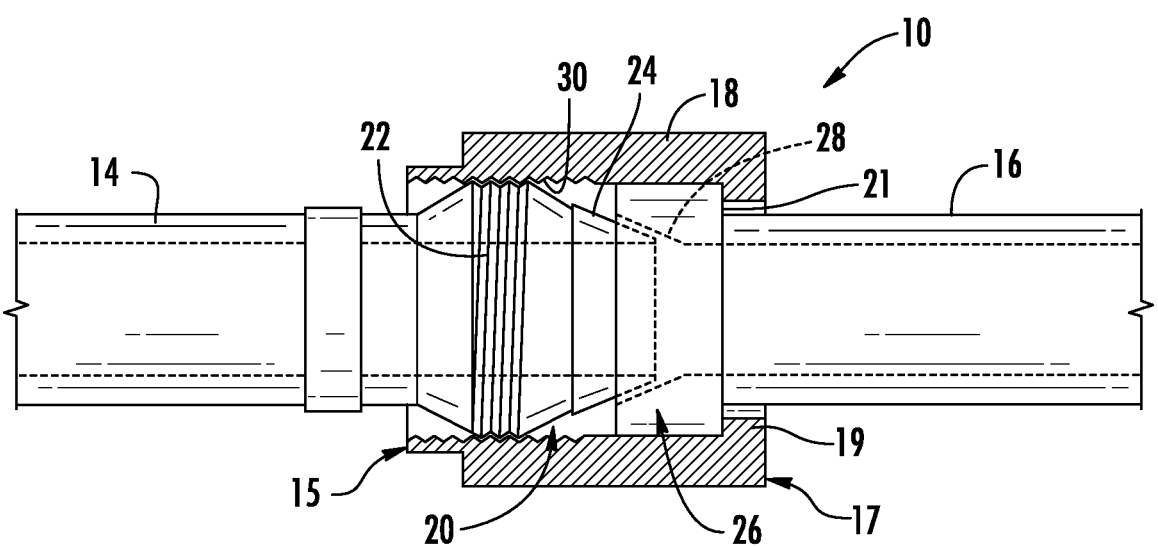
FIG. 2 is a partial cross-sectional view of the threaded joint assembly of FIG. 1.

Referring to the drawings wherein identical reference numerals denote the same elements throughout the various views, FIGS. 1 and 2 depict a threaded joint assembly 10 incorporating an exemplary visual torque indicator 12 constructed according to an aspect of the present invention. The threaded joint assembly 10 includes a first conduit 14 having an internal passage for fluid flow, secured to a second conduit 16 having an internal passage for fluid flow, by a coupling nut 18. For reference purposes, the first conduit 14 constitutes "a first element" of the threaded joint assembly 10, and the second conduit 16 constitutes "a second element" of the threaded joint assembly. The first conduit 14, the coupling nut 18, or both may include suitable tool-engaging surfaces such as wrenching flats. As illustrated in FIG. 2, a distal end 20 of the first conduit 14 includes first threads 22 and a cone-shaped nose 24 extending outwardly from the first threads 22. A distal end 26 of the second conduit 16 includes a conical flared seat 28 configured for mating engagement with the cone-shaped nose 24 to provide a fluid-tight seal. The coupling nut 18 includes a first open end 15, and an opposed second closed end 17. The coupling nut 18 includes a flange 19 which bears against a shoulder 21 of the second conduit 16. The coupling nut 18 includes second threads 30 for mating engagement with the first threads 22 of the first conduit 14. It should be appreciated that the visual torque indicator concepts described herein may be used in other suitable threaded joint assemblies and is not limited to joint assemblies using coupling nuts. Furthermore, it may be used with other threaded connections. For example, a visual torque indicator may be used to indicate that a bolted mechanical joint is properly torqued.

When assembling the threaded joint assembly 10, the cone-shaped nose 24 is inserted into the flared seat 28 for mating engagement. Once the cone-shaped nose 24 is engaged with the flared seat 28, the coupling nut 18 is slid over the cone-shaped nose 24 and flared seat 28 until the second threads 30 engages the first threads 22. The coupling nut 18 is then rotated to permit the first and second threads select 22, 30 to engage and secure the coupling nut 18 to the first distal end 20, thereby securing the cone-shaped nose 24 in the flared seat 28.

It is generally understood that in order to provide a leak-free seal, the coupling nut 18 must be tightened so as to produce a required axial clamping load on the first and second conduits 14, 16. The required axial clamping load may be determined by analysis, reference to established standards, or trial and error. Numerous methods are known which attempt to establish that the required axial clamping load has been applied. One known method is to apply torque of a predetermined magnitude to the coupling nut 18 using a tool such as a wrench or socket. Torque may be measured, for example, by measuring angular displacement or by using a conventional torque wrench. In general, it has been found, for the type of joint assembly 10 shown in FIG. 1, that the integrity of the fluid seal is not particularly sensitive to the exact value of the clamping load applied, so long as it exceeds some minimum. For the purposes of the present invention, the term "torqueing" or "torqued" refers to the process of applying sufficient axial clamp load using an appropriate tool. Stated another way, a joint that has been "torqued" has been tightened beyond a mockup or hand-tight condition.

As will be explained further below, the visual torque indicator 12 provides a direct indication that the appropriate axial clamping load has been applied, using a predetermined torque magnitude as a proxy.

Figure 3:
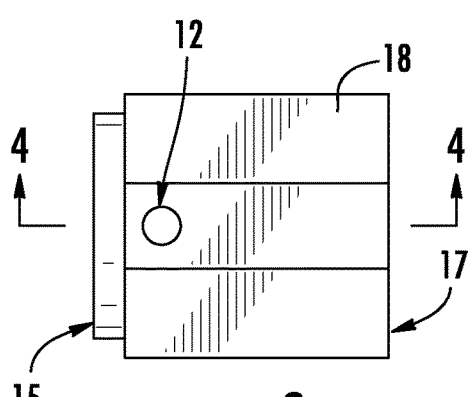
FIG. 3 shows a coupling nut of the threaded joint assembly of FIG. 1.
Figure 4:
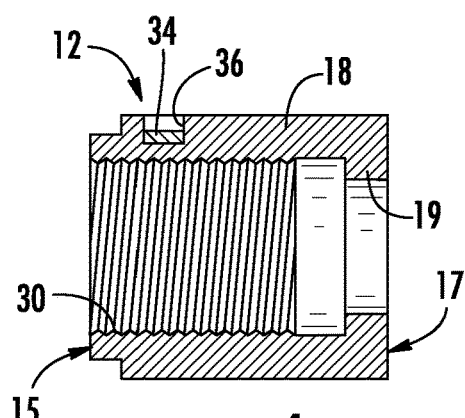
FIG. 4 is a view taken along lines 4-4 of FIG. 3.
Figure 5:
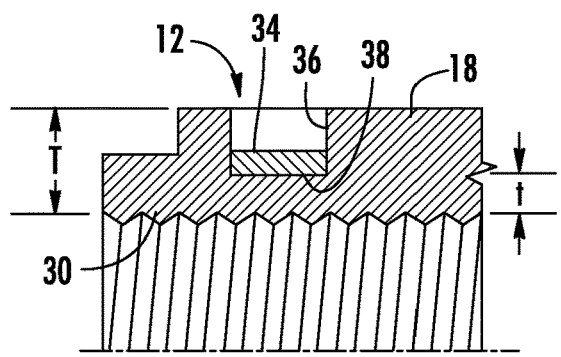
FIG. 5 is an enlarged view of a portion of FIG. 4.

FIGS. 3-5 illustrate the coupling nut 18 and visual torque indicator 12 in more detail. The visual torque indicator 12 includes strain-responsive material 34 disposed in or on a body of the coupling nut 18. (Strain is commonly defined as the relative change in dimension of an object in response to an applied force). One suitable example of a strain-responsive material is a piezochromic pigment. Piezochromic pigments are available as liquids that are applied in a similar fashion to paint and dry to a solid state, forming a thin layer. These pigments have the property of changing color or other discernible aspect of their visual appearance when a strain of a predetermined magnitude is applied. Stated another way, they are configured to change visual appearance in response to application of a strain. These different states of the visual appearance are referred to herein as a "untorqued" appearance, and a "torqued" appearance. Further, these pigments may be reversible or non-reversible. A reversible pigment is capable of changing from one state or visual appearance to the other and back again when the predetermined strain is applied and removed. A non-reversible pigment changes from one state or visual appearance to the other when the predetermined strain is applied a first time and will retain the changed state or visual appearance even when the strain is reduced or removed.

Suitable piezochromic pigments are commercially available from the OLIKROM company of Pessac, France. In the illustrated example, the piezochromic pigment 34 is reversible to enable reuse.

When the coupling nut 18 is torqued, it undergoes a strain which is transferred to the piezochromic pigment 34, which then changes color. For example, the initial color might be red, changing to green when the proper torque has been applied.

Figure 6:
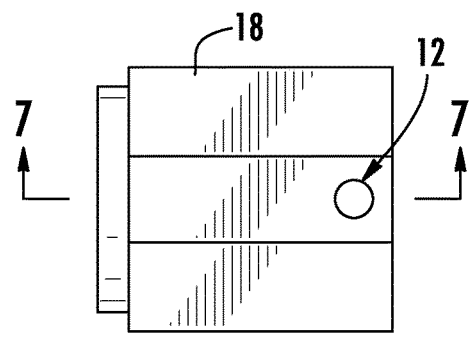
FIG. 6 shows a coupling nut for a threaded joint assembly incorporating a visual torque indicator.
Figure 7:
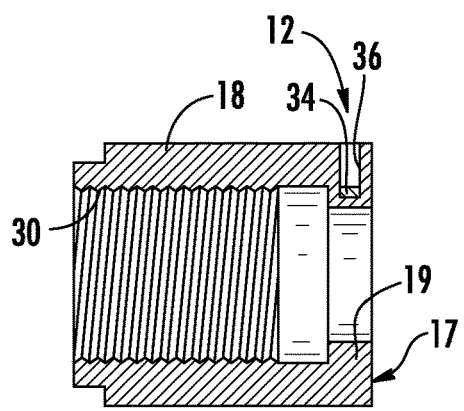
FIG. 7 is a view taken along lines 7-7 of FIG. 6.
Figure 8:
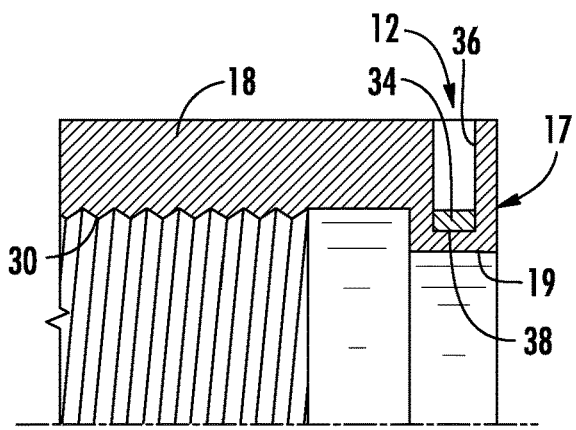
FIG. 8 is an enlarged view of a portion of FIG. 7.

Available piezochromic pigments require a predetermined minimum strain magnitude in order to activate the visual change. Accordingly, the visual torque indicator 12 may be positioned to the coupling nut 18 at a location which undergoes a relatively high strain under torqueing. In the example shown in FIGS. 3-5 the piezochromic pigment 34 is applied outboard of the second threads 30, near the open end 15 of the coupling nut 18 opposite the flange 19. FIGS. 6-8 show an alternative configuration wherein the piezochromic pigment 34 is applied near the flange 19 of the coupling nut 18.

To further aid in the efficacy of the visual torque indicator 12, it may be applied in an area of reduced material thickness "t". In the illustrated example, the piezochromic pigment 34 is applied to a bottom wall 38 of a blind bore 36 which is formed in the body of the coupling nut. The blind bore 36 may be created by drilling a small hole to a depth less than a thickness "T" of the coupling nut 18.

For example, if a nominal wall thickness "T" at the second threads 30 is on the order of 1.3 mm (0.05 inches), then the wall thickness "t" of the blind bore 36 might be half or less of that amount. Thus, the bottom wall 38 of the blind bore 36 would be a small area of reduced thickness at the base of the threads 30 or flange 19. It should be appreciated that the visual torque indicator 12 may include just the piezochromic pigment 34 without the blind bore 36 or the piezochromic pigment 34 in combination with another suitable structure, such as a dimple, slot, etc.

Figure 9:
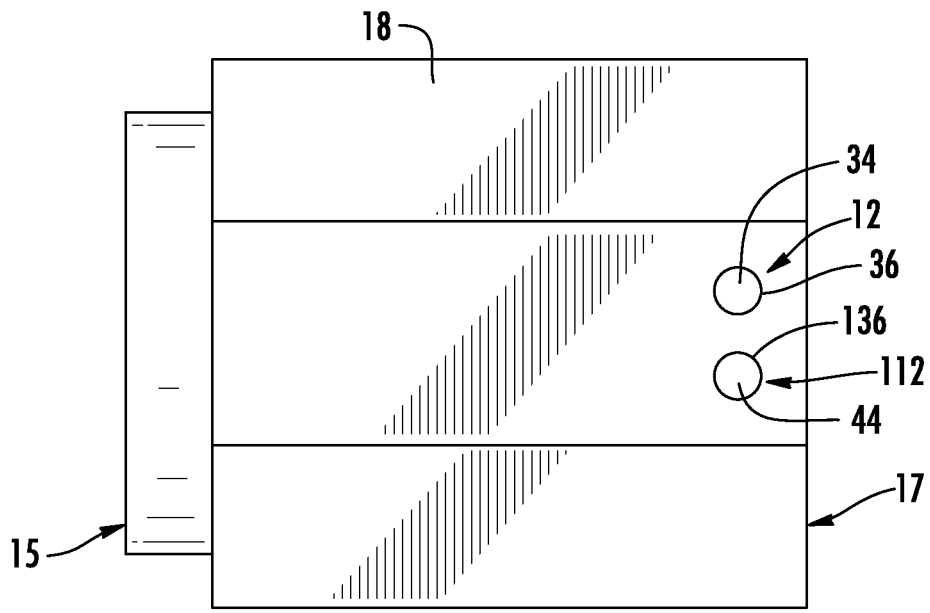
FIG. 9 shows a coupling nut for a threaded joint assembly incorporating a visual torque indicator.
Figure 10:
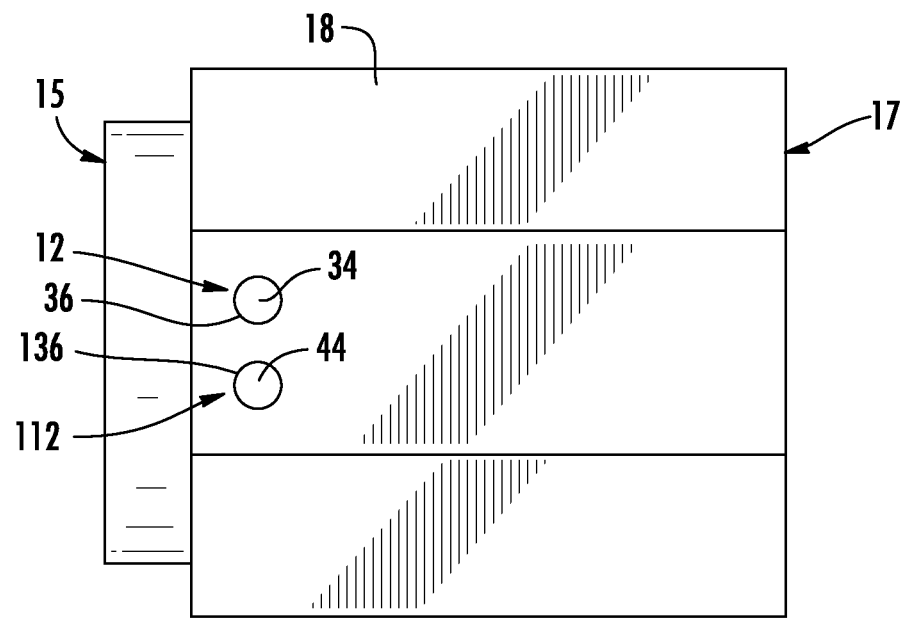
FIG. 10 shows a coupling nut for a threaded joint assembly incorporating a visual torque indicator

Referring to FIGS. 9 and 10, the coupling nut 18 may include multiple visual torque indicators 12, 112. As illustrated, FIG. 9 shows two visual torque indicators 12, 112 located near end 17 and FIG. 10 shows two visual torque indicators 12, 112 near end 15. While over-torqueing the coupling nut 18 generally does not increase the risk of leaks, it can damage the coupling nut 18 and prevent it from being reused properly. As discussed above, a reversible piezochromic pigment 34 is used to indicate proper torqueing; however, if the coupling nut 18 is over-torqued, the piezochromic pigment 34 would permanently display the "torqued" color. Thus, if the coupling nut 18 were reused or if the coupling nut 18 was accidentally loosened (e.g. through vibration), the visual torque indicator 12 would display the "torqued" color even though the coupling nut 18 may not be properly torqued or had not been torqued at all.

By incorporating multiple visual torque indicators 12, 112, a non-reversible piezochromic pigment 44 may be used in addition to or as an alternative to the reversible piezochromic pigment 34. For example, as illustrated in FIGS. 9 and 10, two visual torque indicators 12, 112 are provided on coupling nut 18. As discussed above, the visual torque indicators 12 include blind bores 36, 136 and a piezochromic pigment. In this particular instance, a reversible piezochromic pigment 34 tuned to transition colors at a basic torque level (i.e., in response to a strain of a predetermined first magnitude) is applied to the first blind bore 36 and a non-reversible piezochromic pigment 44 is applied to the second blind bore 136. The non-reversible piezochromic pigment 44 would be tuned to transition colors at a level representative of over-torqueing (i.e., in response to a strain of a predetermined second magnitude greater than the first magnitude). Thus, if the non-reversible piezochromic pigment 44 is transitioned, this would indicate that the coupling nut 18 is damaged or defective, indicating to a user that the coupling nut 18 needs to be replaced.

Figure 11:
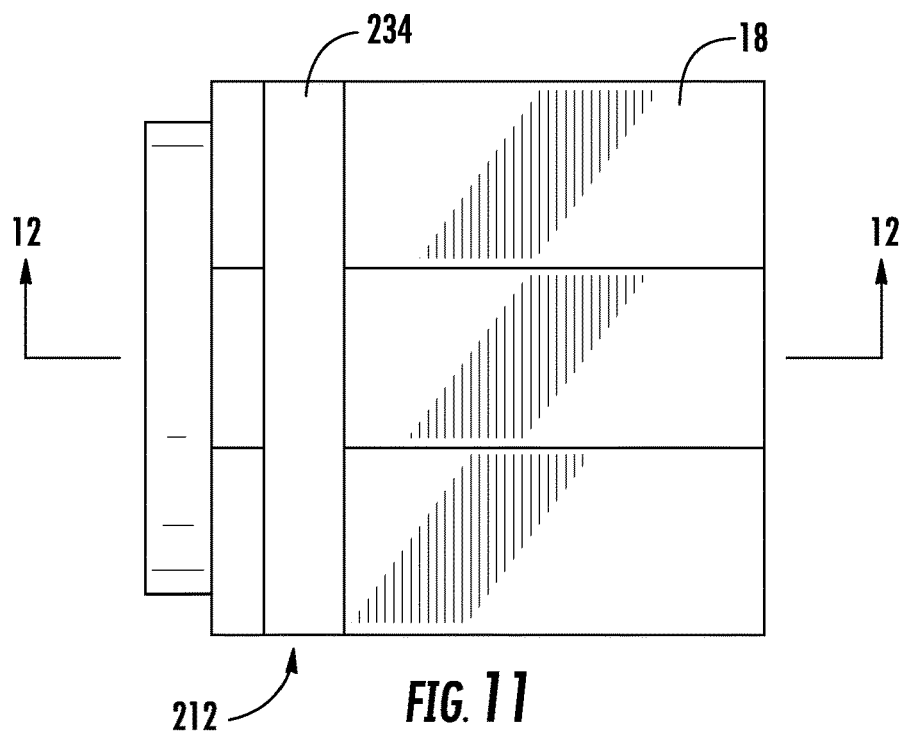
FIG. 11 shows a coupling nut for threaded joint assembly incorporating a replaceable visual torque indicator.
Figure 12:
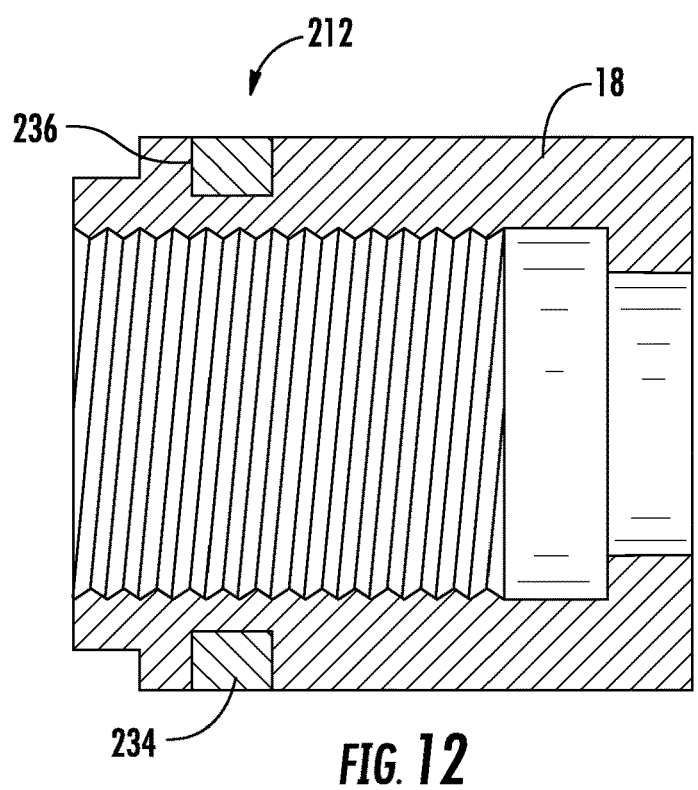
FIG. 12 is a view taken along lines 12-12 of FIG. 11.

Optionally, a visual torque indicator may be configured as a replaceable element of the coupling nut. FIGS. 11-12 illustrate a variation of a coupling nut 18 incorporating a torque indicator 212.

As one example, the visual torque indicator 212 includes a strain-responsive material 234 configured in a ring or band shape. The strain-responsive material 234 may comprise a piezochromic material as described above. Numerous configurations are possible. For example, the strain-responsive material may be formed directly into the ring shape. Alternatively, the ring shape may be formed of a material that is frangible, resilient, or otherwise easily removed or cut away without damaging the remainder of the coupling nut 18. One example of a suitable material is a molded polymer or elastomer, which is infused with or coated with a piezochromic material. Appropriate means may be provided to ensure that strain is transferred between the body of the coupling nut 18 and the strain-responsive material 234. For example, an adhesive (not shown) may be provided between the coupling nut 18 and the strain-responsive material 234, or either element may be provided with a roughened or textured surface, or the strain-responsive material may be connected to the coupling nut 18 with an interference fit.

The strain-responsive material 234 is replaceable. If damaged or worn out through usage, or if it is desired to reuse a coupling nut 18 that includes a nonreversible piezochromic pigment after it has been torqued once, the ring can be pried, cut, or broken off and replaced with another ring. To facilitate this process, original or replacement rings may be provided with a split to allow them to be pried open or may be configured with a ratchet-type of fastener, such as a conventional zip-tie.

The coupling nut 18 may incorporate an area of reduced material thickness as described above. In this example there is a 360° annular groove 236 formed in the body of the coupling nut 18. The ring of strain-responsive material 234 is received in this groove 236.

In use, a user would torque the coupling nut 18 until the piezochromic pigment 34 transitions to a "torqued" color. After all connections are made, the user may then do a quick visual inspection of all connections to verify that all of the coupling nuts 18 have been properly torqued without the need for re-torqueing each individual coupling nut 18. In the case where both reversible and non-reversible piezochromic pigments are used, the visual inspection would also display any over-torqueing that may have occurred, thereby letting the user know that the coupling nut 18 needs to be replaced.

The foregoing has described a visual torque indication for threaded joints. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A threaded element for a mechanical joint, comprising a body including threads and two or more visual torque indicators disposed on the body, each of the visual torque indicators including a strain-responsive material configured to change visual appearance in response to the application of a strain thereto, wherein at least one of the visual torque indicators changes visual appearance with a strain of a first magnitude and at least one of the visual torque indicators changes visual appearance with a strain of a second magnitude.

2. The element of claim 1 wherein the body comprises a coupling nut having internal threads formed therein.

3. The element of claim 1 wherein the torque indicator comprises an area of reduced thickness of the body which carries the strain-responsive material.

4. The element of claim 3 wherein the torque indicator comprises an annular groove formed in the body, and the strain-responsive material is formed into a ring disposed in the annular groove.

5. The element of claim 1 wherein the torque indicator comprises a blind bore formed in the body, the strain-responsive material being disposed on a bottom wall of the blind bore.

6. The element of claim 1 wherein the strain-responsive material comprises a piezochromic pigment.

7. The element of claim 1 wherein the strain-responsive material is reversible.

8. The element of claim 1 wherein, at least one of the visual torque indicators includes a strain-responsive material which is non-reversible and at least one of the visual torque indicators includes a strain-responsive material which is reversible.

9. A threaded joint assembly, comprising:
a first element having first threads;
a second element having second threads complementary to the first threads; and
wherein at least one of the first and second elements includes:
a body having an open end and a flanged end; and
at least one visual torque indicator disposed on the body at the flanged end, the visual torque indicator including a strain-responsive material configured to change visual appearance in response to the application of a strain thereto.

10. The threaded joint assembly of claim 9 wherein the body comprises a coupling nut having internal threads formed therein.

11. The threaded joint assembly of claim 9 wherein the torque indicator comprises an area of reduced thickness of the body which carries the strain-responsive material.

12. The element of claim 11 wherein the torque indicator comprises an annular groove formed in the body, and the strain-responsive material is formed into a ring disposed in the annular groove.

13. The threaded joint assembly of claim 9 wherein the torque indicator comprises a blind bore formed in the body, the strain-responsive material being disposed on a bottom wall of the blind bore.

14. The threaded joint assembly of claim 9 wherein the strain-responsive material comprises a piezochromic pigment.

15. The threaded joint assembly of claim 9 wherein the strain-responsive material is reversible.

16. The threaded joint assembly of claim 15 wherein at least one of the visual torque indicators is responsive to a strain of a predetermined first magnitude, and at least one of the visual torque indicators is responsive to a strain of a predetermined second magnitude greater than the first magnitude.

17. The threaded joint assembly of claim 9 wherein the body includes two or more visual torque indicators, at least one of the visual torque indicators including a strain-responsive material which is non-reversible.

18. A threaded joint assembly, comprising:
a first fluid conduit having external threads on a first distal end of the first fluid conduit;
a second fluid conduit having a coupling nut positioned on and secured to a first distal end of the second fluid conduit, the coupling nut including an open end for receiving the first distal end of the first fluid conduit, internal threads complementary to the external threads, and a flange end configured to secure the coupling nut to the first distal end of the second fluid conduit, the coupling nut further including at least one visual torque indicator disposed on the coupling nut at the flange end, the visual torque indicator including a piezochromic pigment configured to change visual appearance in response to the application of a strain thereto.

19. The threaded joint assembly of claim 18 wherein the first fluid conduit includes a conical nose, and the second fluid conduit includes a conical seat.

\* \* \* \* \*